United States Patent [19]

Terao

[11] 3,911,491

[45] Oct. 7, 1975

[54] AUTOMATIC TAPE LOADING RECORDING-REPRODUCING APPARATUS OF DRUM ROTATION TYPE

[75] Inventor: Yoshikazu Terao, Tokyo, Japan

[73] Assignee: Victor Company of Japan, Ltd., Yokohama, Japan

[22] Filed: Apr. 19, 1973

[21] Appl. No.: 352,415

[30] Foreign Application Priority Data

Apr. 21, 1972 Japan .......................... 47-47285[U]

[52] U.S. Cl. .......................................... 360/85; 360/95

[51] Int. Cl.$^2$ .......................................... G11B 15/66

[58] Field of Search .................. 360/85, 95; 226/97; 242/51.19 A

[56] References Cited

UNITED STATES PATENTS

| | | | |
|---|---|---|---|
| 3,534,893 | 10/1970 | Maxson | 226/97 |
| 3,681,539 | 8/1972 | Eibensteiner | 360/85 |
| 3,721,776 | 3/1973 | Inaga | 360/85 |
| 3,740,492 | 6/1973 | Inaga | 242/55.19 A |
| 3,740,495 | 6/1973 | Kihara | 360/85 |
| 3,792,491 | 2/1974 | Inaga | 360/85 |
| 3,821,799 | 6/1974 | Sumiyoshi | 360/85 |

*Primary Examiner*—Stanley M. Urynowicz, Jr.

[57] ABSTRACT

An automatic tape loading recording-reproducing apparatus of drum rotation type comprises a rotary guide drum. The tape is drawn out of a cassette and pulled around the guide drum conformably over a specific region thereof. The guide drum is rotated when the tape contacts the guide drum conformably over a very slight extent thereof. An air film is formed between the rotating guide drum and the tape thus pulled around.

8 Claims, 3 Drawing Figures

AUTOMATIC TAPE LOADING RECORDING-REPRODUCING APPARATUS OF DRUM ROTATION TYPE

BACKGROUND OF THE INVENTION

This invention relates to an automatic tape loading recording and/or reproducing apparatus of the drum rotation type, and more particularly to an automatic tape loading recording and reproducing apparatus wherein a tape, wound around a spool within a cassette, is drawn out and brought into contact, conformably with a guide drum having a rotating head obliquely tracing over a specific angular region of the drum. This loading operation is carried in a smooth manner.

In general, an automatic tape loading, video tape recorder of the cassette type has an organization of parts whereby a magnetic tape is drawn out of a cassette. Then, it is brought into contact conformably with a guide drum containing a rotating head for tracing an oblique track over a specific angular region around the drum, particularly of 180° or more. Further, loading is carried out automatically in a specific tape travel path. In this case, it is necessary for the magnetic tape to be wound helically around the circumferential surface of the guide drum, that is, obliquely relative to the plane of the rotating head. Consequently, at the time of automatic tape loading, the magnetic tape is wound conformably around the circumferential drum surface as it moves with sliding contact against that surface in the drum.

Among automatic tape loading record and/or reproducing apparatuses having guide drums, there are (1) a type wherein the guide drum is stationary, and only a rotating head rotates between an upper guide drum and lower guide drum (which together constitute the stationary guide drum), and (2) a type wherein the guide drum is of the rotating type, and the entire guide drum (provided with a rotating head) is rotated. Or, a rotating head is provided on either an upper guide drum or a lower guide drum, and only the guide drum thus provided with the rotating head is rotated.

An automatic tape loading magnetic tape recording-reproducing apparatus of the latter drum rotation type has been known heretofore. At the start of automatic tape loading and recording-reproducing, the magnetic tape is brought into contact with the guide drum, conformably and helically. Then, at the instant when the automatic loading has been substantially completed, the rotating drum rotates for the first time. The tape unloading operation starts, whereupon the rotating drum stops its rotating. Accordingly, the rotating drum is in a stopped state in the middle of the automatic tape loading operation or in the middle of the reverse operation of unloading.

For this reason, in this known apparatus, the magnetic tape is brought into contact conformably with the circumferential surface of the drum. The tape undergoes a sliding contact across this surface of the drum, which is stopped. Consequently, the magnetic tape encounters a large frictional resistance which is produced between it and the drum surface. Therefore, the above described conformably contacting operation of the tape heretofore could not be accomplished smoothly.

Because of the above mentioned large frictional resistance, it is necessary to use compulsory force to effect the conformably contacting operation of the tape. Accordingly, the motive power surface source for driving the automatic tape loading operation requires a large power source. When the magnetic tape is subjected to such an excessive force, its magnetic surface is damaged. Moreover, the repeated stress action tends to break the tape itself.

SUMMARY OF THE INVENTION

Therefore, it is a general object of the present invention to provide a novel and useful automatic tape loading recording-reproducing apparatus of the drum rotation type, in which the above described difficulties have been overcome.

More specifically, an object of the invention is to provide a automatic tape loading recording-reproducing apparatus. Part of the tape comes into contact conformably with the circumferential surface of the guide drum, over a specific angular extent thereof. The rotating drum is rotated, and an air film is formed between the rotating drum and the tape. By this provision according to the invention, the magnetic tape comes into contact conformably with the drum in a smooth manner and without being subjected to a large frictional resistance force from the surface of the drum.

Another object of the invention is to provide an automatic tape loading recording-reproducing apparatus in which the guide drum is rotated at the latest, before the tape comes into contact conformably with a part of the circumferential surface of the guide drum, over a very small angular region thereof.

Other objects and features of the invention will be apparent from the following detailed description when read in conjunction with the accompanying drawings, throughout which like parts are designated by like reference numerals.

DETAILED DESCRIPTION

Figure 1:
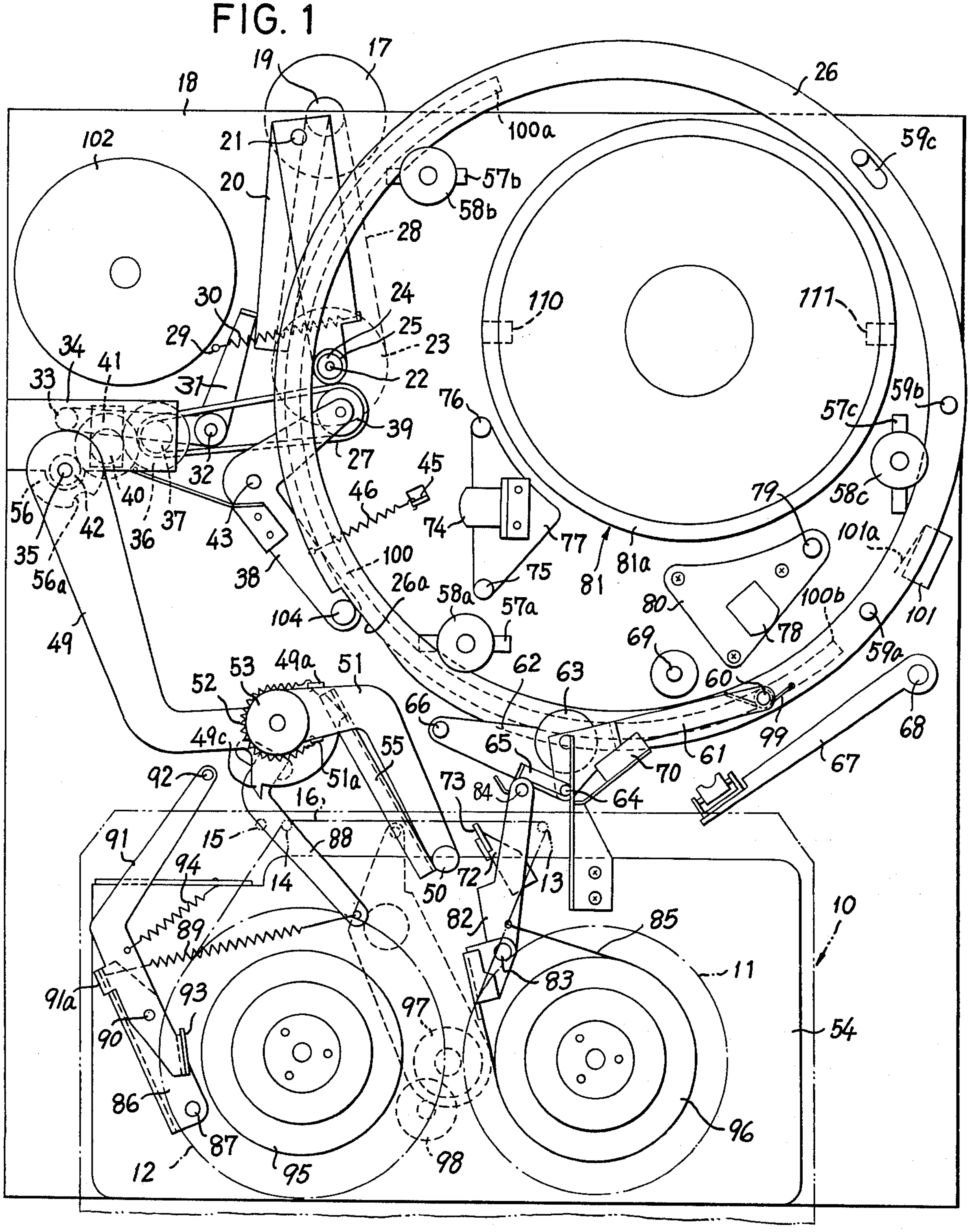
FIG. 1 is a plan view showing the essential parts of one embodiment of an automatic tape loading recording-reproducing apparatus of drum-rotating type according to the present invention the FIG. 1 showing representing the state of the apparatus prior to automatic tape loading.

A tape cassette 10 contains a built-in supply reel 11 and a take-up reel 12. Openings (not shown) are formed on the front face and lower cover of the tape cassette 10, within which pins 13, 14, and 15 are provided for guiding the tape. A magnetic tape 16 drawn out from the supply tape reel 11 is guided by the pin 13, passes by the above mentioned opening, and, passing between the pins 14 and 15, reaches the tape take-up reel 12. The tape 16 which has thus passed by the opening has its magnetic surface facing the outer side of the casing of the cassette 10.

A loading motor 17 is fixed to the lower side of the chassis 18 of the recording and reproducing apparatus. A U-shaped swingable lever 20 is pivoted on a pivot pin 21. A shaft 22 is journaled on the distant end of the upper arm. The lower end of this shaft 22 extends through and beyond the chassis 18 and, at its lower extremity, supports a pully 23 fixed thereto. Driving rollers 24 and 25 are provided on the upper end of this shaft 22. The cylindrical surface of the driving roller 24 confronts the inner surface of a revolving ring 26, while the driving roller 24 confronts a driving belt 27. A pulley 19, fixed to the rotor shaft of the motor 17, is coupled to the pulley 23 by means of a belt 28 stretched therearound. The U-shaped swingable lever 20 is continually urged to rotate in the clockwise direction, as viewed in FIG. 1, responsive to the tension of a spring 30 stretched between a part of the lever 20 and a pin 29 embeddedly fixed to the chassis 18. Normally this rotation of the lever 20 is limited at the position indicated in FIG. 1 by the engagement of the lower arm of this lever with a bent part of the tip of one arm of an L-shaped lever 31. This L-shaped lever 31 is rotatably supported on a shaft 32. At the end of its other arm lever 31 supports a pin 33, fixed thereto.

A support bracket 34 is fixed to the chassis 18 and supports a rotating shaft 35. The above mentioned belt 27 is stretched around and between a pulley 39 on the distant end of one arm of a bellcrank lever 38 and a pulley 37 unitarily joined to a gear 36. Lever 38 is pivoted on a pivot shaft 43. Torque is transmitted to the rotating shaft 35 by way of gears 36, 40, 41, and 42. At the one end of its other arm, lever 38 supports a pin 44 fixed thereto. Lever 38 is continually urged to rotate in the counterclockwise direction responsive to the tension of a spring 46 stretched between a part of this lever and a projection 45 on the chassis.

A guide lever 49 is fixed at its near end to the upper end of the shaft 35. At its distant end, it pivotally supports one end of a guide lever 51, which has at its other end a guide pin 50 embeddedly fixed thereto. A tension spring 52 is stretched from a projection 49a on the guide lever 49, around the peripheral surface of a pulley 53 to a projection 51a on the guide lever 51. The lever 51 is continually urged by the tension of the spring 52 to rotate in the clockwise direction relative to the lever 49. When the apparatus is in its stopped state, the guide pin 50 engages a straight-line guide surface of a guide plate 55 fixed to a sub-chassis 54. The lever 51 is restricted in its rotation and is in its state shown in FIG. 1. Projections 49*b* and 49*c* (FIG. 2) on the guide lever 49, cooperate with a projection 51b on the lower side of the guide lever 51 to limit the rotation of the guide lever 49, within a specific range. A cam 56 is fixed to the lower end of the shaft 35. The peripheral cam surface, of this cam 56, is contacted and followed by the pin 33 embedded in the L-shaped lever 31. On the peripheral surface of the cam 56, there is formed a cutout part 56a for engagement with the pin 33 during the rotation of the shaft 35 up to the position indicated in FIG. 2.

The above mentioned revolving ring 26 is inclined so that its lower right side, as viewed in FIG. 1, is at its lowest part. The ring 26 is revolvably held in this inclined attitude by guide rollers 58*a*, 58*b*, and 58*c*, which are rotatably supported respectively by three supports 57*a*, 57*b*, and 57*c*. The revolving ring 26 has a cutout part 26*a* on its outer peripheral surface. Fixed on its upper surface are the guide pins 59*a*, 59*b*, and 59*c* and a pivot pin 60. The pivot pin 60 pivotally supports one end of a lever 61 which carries a support member 62 at its other end. This lever 61 is continually urged to rotate in the counterclockwise direction by a torsion spring 99, but its rotation is limited at a specific position. Within the support member 62, a pinch roller 63 is rotatably supported. A support post 64 and an engaging member 65 are fixed to the support member 62, which further supports at its extreme end a guide post 66.

Figure 3:
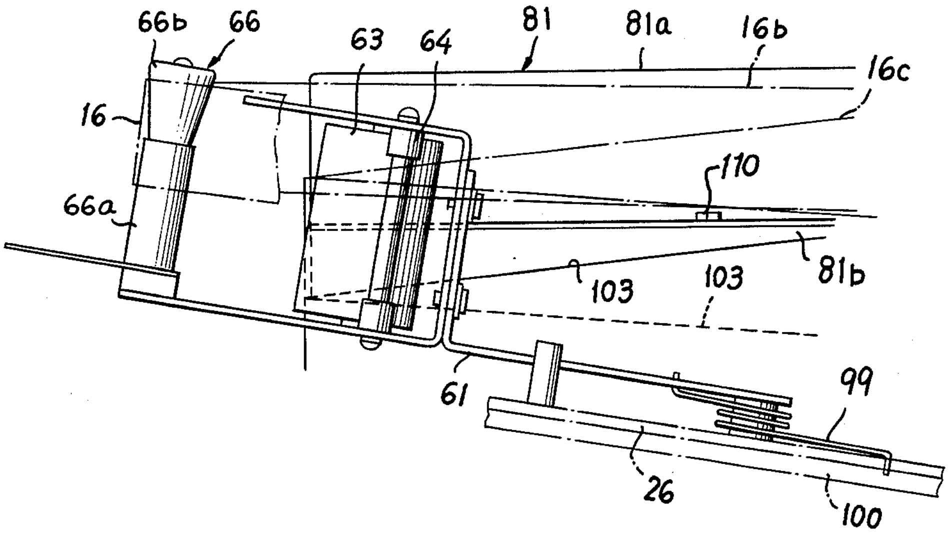
FIG. 3 is a side view of a part of the apparatus shown in FIG. 2 as viewed along the line III—III and looking in the arrow direction.

As shown in FIG. 3, this guide post 66 has a structure made up of a lower cylindrical part 66*a* and an upper conical part 66*b* of an inverted frustoconical shape, fixed coaxially to the lower part 66*a*. The dimension of these parts are selected so that the diameter of the lower cylindrical part 66*a* is slightly greater than the minimum diameter of the upper inverted frustoconical part 66*b*, and is less than the maximum diameter of the upper part. A shoulder or ledge part is thereby formed at and around the upper extremity of the lower cylindrical part 66*a*.

An operation lever 67 is rotatably supported at one end by a shaft 68. It is in the position indicated in FIG. 1 when recording or reproducing is not being carried out. At the time of recording or reproducing, this lever 67 is rotated to its position shown in FIG. 2. Lever 69 then presses the support post 64 toward a capstan 69, thereby to swing the lever 61 and cause the pinch roller 63 to press against the capstan 69. A luminous device (such as a lamp) 70 is mounted on a support member 71 fixed to the sub-chassis 54. Similarly, a light-receiving device 73, such as a photocell, is mounted on a support member 72 fixed to the sub-chassis 54. These two devices 70 and 73 cooperate to optically detect a leader bonded to the each terminal end of the magnetic tape 16 and thereby to detect the terminal of the tape.

A full-width erasing head 74 and guide posts 75 and 76 are mounted on a support base 77, which is separated by a specific distance from the chassis 18 and is positionally adjustable. For control signals and audio signals 7, a head block 78 and a guide post 79 are mounted on a support base 80 disposed with an inclination relative to the chassis 18. The head block 78 and the guide post 79 are perpendicular to the plane of the revolving ring 26. Similarly, the capstan 69 is also set at an inclination relative to the chassis 18.

As shown in FIG. 3, a guide drum 81 is disposed within the revolving ring 26 and comprises upper guide drum 81*a* and lower guide drum 81*b*. The lower guide drum 81*b* is fixed to the chassis 18, while the upper guide drum 81*a*, provided with rotary video heads, is separated with a slight gap from the lower guide drum 81*b* and is adapted to rotate. This guide drum 81 is provided with an inclination relative to the chassis 18. The head tips of a plurality of, for example, two rotary video heads 110 and 111, are disposed on the upper guide drum 81*a* in a manner to project slightly outward from the circumferential surface of the drum. A tape guide plate 103 forms a helical ledge or step on the lower guide drum 81*b* in a manner to project slightly from the circumferential surface thereof. This tape guide plate 103 guides the lower edge of the magnetic tape as it makes contact conformably and traveling along the circumferential surface of the guide drum 81, thereby to determine the height position at which the tape travels.

A tension lever 82, at one end thereof, is pivoted on a shaft 83. On its other end, it supports a tension post 84 fixed thereto. A brake band 85, has two ends which are fixed to a tension lever 82. Band 85 is disposed about the periphery of a supply reel disk 96. When the tension lever 82 is turned in the counterclockwise direction, the brake band 85 is tightened to apply a braking force to the reel disk 96. A lever 86 is pivoted at its near end on a shaft 87 and is urged to turn in the clockwise direction by a spring 89 stretched between it and an operating lever 88. When recording or reproducing is not being carried out, this lever 86 is rotated in the counterclockwise direction against the spring force of the spring 89 responsive to another spring (not shown). Its rotation is limited at a specific position as shown in FIG. 1. At a point remote from the shaft 87, the lever 86 supports a pivot pin 90 fixed thereto and pivotally supporting a tape take-up side tension lever 91.

At its one end, the tension lever 91 supports a tension pole 92 fixed thereto. At its other end, it is provided with a brake shoe 93. This tension lever 91 is urged to turn in the clockwise direction by a spring 94 stretched between it and the sub-chassis 54. When the lever 86 is in its position indicated in FIG. 1, the rotation of the tension lever 91 is restricted at the position where a bent flange part 91*a* thereof comes into contact with the lever 86. The brake shoe 93 is separated from a take-up reel disk 95. At the time of recordingg or reproducing, the operating lever moves, and, since the tension of the spring 89 increases, the lever 86 reaches a position where it has rotated in the clockwise direction. The tension pole 92 and the brake shoe 93 reache their operational states.

A reel disk driving wheel 97 is adapted to operate in accordance with mode changeover operations, such as; record-reproduce, stop, and rewind For each of these modes, wheel 97 is moved, respectively, into a position for pressing against the take-up reel disk 95, a neutral position, and a position for pressing against the supply reel disk 96. A wheel 98 is provided to apply a torque to the take-up reel disk 95 in the direction for unwinding the magnetic tape during the rewinding operation of the magnetic tape which has been drawn out of the cassette and is wrapped around the guide drum 81.

On the lower surface of the aforementioned revolving ring 26, there is projectingly fixed an arcuate actuating part 100. The angular extent of this actuating part 100 from its leading end 100*a*, as viewed in the direction of revolution, to the trailing end 100*b* is of the order of 180° or more. A microswitch 101 is mounted on the chassis 18 near the position where the revolving ring 26 most clearly approaches the chassis. When the revolving ring 26 revolves, the actuating part 100 pushes the operating member 101*a* of the microswitch thereby to close the switch.

The length and position of the arc of the actuating part 100 of the revolving ring 26 are appropriately determined with respect to positions such as those of the tape guide post 66 and the microswitch 101, taken as reference datum points. More specifically, the length and position of the actuating part 100 are selected so that the outer peripheral surface of the leading end 100*a* of the actuating part 100 pushes the operating member 101*a* to close the microswitch 101, when the guide post 66 moves, together with the revolution of the revolving ring 26, from the position indicated in FIG. 1 to the position indicated by the two-dot chain line 66*a* in FIG. 2. When the revolving ring 26 revolves further and assumes the position indicated by full line in FIG. 2, the guide post 66 has completed tape loading. The actuating part 100 is still pushing the operating member 10*a* and holding the microswitch 101 in closed state.

The closing of the microswitch 101 causes power from a power source to be supplied to a main motor 102, which thereupon rotates. The driving power of this main motor 102 is transmitted by way of known transmission means such as pulleys and belts to moving parts such as the upper guide drum 81*a*, the capstan 69, and the roller 97 for reel disk driving.

The automatic tape loading recording-reproducing apparatus of the above described organization according to the invention operates as follows.

In the state prior to the start of the automatic tape loading operation as indicated in FIG. 1, the L-shaped lever 38 has been rotated in the counterclockwise direction by the spring 46. Fixed to one end of this lever 38, pin 44 fits into the cutout part 26*a* of the revolving ring 26. The belt 27 passing around the pulley 39 at the other end of the lever 38 is pressed against the driving wheel 25. Furthermore, the L-shaped lever 31 is in a position where the pin 33 is pressed into contact with the outer peripheral surface of the cam 56 and has rotated in the clockwise direction. The U-shaped lever 20 is engaged with the other end of the lever 31 and is in a position to which it has rotated in the counterclockwise direction. Consequently, the driving wheel 24 is in a position where it is separated from the internal surface of the revolving ring 26. The guide post 50 is in the position indicated in FIG. 1, in contact with the guide plate 55. The guide lever 51 is in a position to which it has rotated in the counterclockwise direction against the tension force of the spring 52.

With the apparatus in the above described state, the cassette 10 is inserted from above into position in the recording-reproducing apparatus, as indicated in FIG. 1. The guide post 50 is fitted into the cassette 10 through an opening (not shown) and is thus disposed on the inner side of the tape 16. Furthermore, the spools holding the tape supply reel 11 and the tape take-up reel 12 engage respective reel tables on the apparatus side. When the PLAY button (not shown) of the apparatus is depressed with the apparatus in this state, the loading motor 17 starts. The pulley 19 is rotated in the clockwise direction. The rotation of the pulley 19 is transmitted through the belt 28 and the pulley 23 to the shaft 22. The driving wheels 24 and 25 are rotated in the clockwise direction. At this time, the driving wheel 24 is separated from the revolving ring 26, whereby the rotation of the wheel 24 is not transmitted to the ring 26. On the other hand, the driving wheel 25 and the belt 27 are in close contact. The rotation of the wheel 25 is transmitted to the belt 27 and thus to the pulley 37. The shaft 35 is rotated in the counterclockwise direction by way of the gears 36, 40, 41, and 42. Consequently, the guide lever 49 and the cam 56 rotate integrally with the shaft 35 in the counterclockwise direction.

As a result of the rotation of the guide lever 49, the guide lever 51 is rotated about the pulley 53 responsive to the tension force of the spring 52, with lever 15 swinging in the clockwise direction relative to the guide lever 49. Guided by the guide plate 55 during this operation, the guide post 50 moves while drawing the magnetic tape 16 out from the interior of the cassette 10. Arm 51 and post 50 assume the state indicated by the two-dot chain line in FIG. 2. Then, when the guide lever rotates further in the counterclockwise direction, the projection 51*b* of the guide lever 51 and the projection 49*c* of the guide lever 49 engage, whereby the clockwise rotation of the lever 51 is restricted. Thereafter the lever 51 rotates integrally with the lever 49 about the shaft 35, in the counterclockwise direction, until it reaches the position indicated by full line in FIG. 2. At this time, the magnetic tape which has been drawn out of the cassette 10 by the guide post 50 forms a tape loop 16*a* of substantially triangular shape as indicated by single-dot chain line in FIG. 2.

Figure 2:
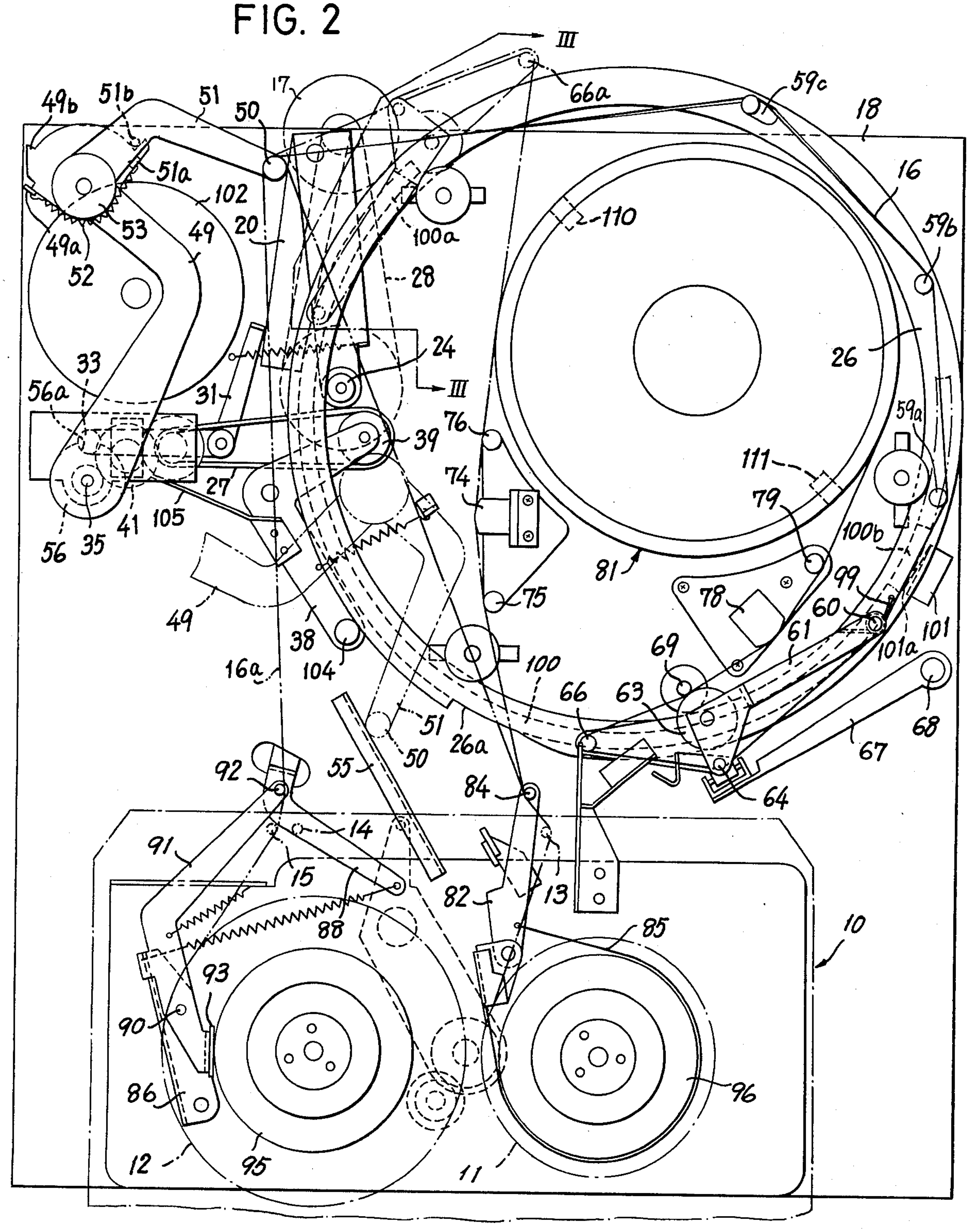
FIG. 2 is a plan view of the apparatus shown in FIG. 1, after automatic tape loading.

At the time when the guide lever 49 reaches the position indicated by full line in FIG. 2 as described above, and when the formation of the magnetic tape loop 16*a* is completed, the cam 56 has also been rotated integrally to a position where its cutout part 56*a* confronts the pin 33. Consequently, the pin 33 fits into the cutout part 56*a* of the cam 56. The L-shaped lever 31 is rotated counterclockwise by way of the lever 20, under the tension force of the spring 30. With the rotation of the lever 31, the U-shaped lever 20 is rotated clockwise by the spring 30, whereby the driving wheel 24 presses against the internal surface of the revolving ring 26. Accordingly, the rotational power of the motor 17 is transmitted by way of the driving wheel 24 to the ring 26, which thereupon is driven in the clockwise direction. In this connection, even when the U-shaped lever 20 is in a state where it has been rotated only slightly in the clockwise direction as mentioned above, the rotation of the driving wheel 25 is being transmitted to the belt 27.

As the revolving ring 26 revolves clockwise from its position indicated in FIG. 1, the pin 104 which has been engaged with the cutout part 26*a* moves relative to the ring 26 and is guided onto an inclined part. The L-shaped lever 38 is rotated in the clockwise direction against the tension force of the spring 46. Consequently, the belt 27 separates away from the driving wheel 25. The transmission of motive power to the shaft 36 is cut off. As a result, the rotation of the guide lever 49 is stopped at the position indicated by full line in FIG. 2. The revolving ring 26 is thereafter revolved independently. The clockwise rotation of the lever 38 causes the outer tip of an engagement member 105, fixed to the lever 38, to engage with a tooth of the gear 41. Consequently, the levers 49 and 51 are positively locked in their positions indicated by full line in FIG. 2.

Since the revolving ring 26 is inclined, as described hereinbefore, its rotation first causes the guide post 66, the pinch roller 63, the shaft 60, and the guide pins 59*a*, 59*b*, and 59*c* to pass by in succession and below the point where the magnetic tape 16 is first transversed and, as viewed in plan view, to enter the above mentioned tape loop 16*a*. Then, as the revolving ring 26 revolves further, the guide post 66 and the succeeding parts named above progressively rise in height in accordance with the inclination of the ring. Together with this revolution of the ring 26, the guide post 66 and the succeeding parts, as viewed in plan view, travel from within the tape loop 16*a* toward the outside.

During this movement, the guide post 66 engages the magnetic tape 16. As the revolving ring 26 revolves, post 61 pulls the tape around, as it draws the tape out of the cassette 10. Since the brake shoe 93 presses against the take-up reel disk 95 at this time, the take-up reel 12 is braked. Since the band brake 31 is not applying braking force on the supply reel disk 96, the magnetic tape 16 can be readily drawn out from the supply reel 11. As the revolving ring 26 revolves in the above described manner, the guide post 66 reaches the position indicated by single-dot chain line 66*a* in FIG. 2. The magnetic surface of tape 16 (which has been engaged and drawn out by the guide post 66) begins to conformably contact one part of the circumferential surface of the upper guide drum 81*a*.

At this time, the leading end 100*a* of the actuating part 100, projecting on the lower surface of the revolving ring 26, revolving together with the revolving ring 26, and reaches the position indicated by single-dot chain line in FIG. 2. Part 100 pushes the operating member 101*a* of the microswitch 101, closing this switch. The main motor 102 is thereby switched on to drive parts such as the capstan 69 and the driving roller 97. At the same time, the upper drum 81*a* of the guide drum 81 begins rotating at a high speed (e.g., 30 revolutions per second) in the clockwise direction as viewed in FIG. 2.

On one hand, the magnetic tape 16 which has begun to contact conformably the upper guide drum 81*a* (as mentioned above) is at a height position indicated by single-dot chain line 16*b* in FIG. 3. The tape contacts conformably the circumferential surface of the guide drum over an increasingly wider angular region, as the revolving ring 26 revolves further in the clockwise direction. During this operation, the magnetic tape 16 is drawn out from only the supply reel 11. Furthermore, since the revolving ring 26 is provided with an inclination, the magnetic tape 16 contacting conformably the left side, as viewed in FIG. 2, of the guide drum 81, advances in the circumferential direction of the guide drum 81 as its conformably contacting action progresses. At the same time, it is shifted downward from the position indicated by single-dot chain line 16*b* in FIG. 3 to the position 16*c*, whereby the conformable contacting configuration becomes helical.

At this time in the operation, the upper guide drum 81*a* is rotating at a high speed, as mentioned above. Thus, air is introduced between the upper guide drum 81*a* and the magnetic tape brought into position for conformable contact therewith, thereby to form a very thin air film therebetween. Consequently, the magnetic tape 16 is caused to conform smoothly in a helical state to the circumferential surface of the guide drum 81 as the revolving ring 26 revolves. Tape 16 is held in a separated state relative to the surface of the upper guide drum 81*a* by the thin air film thus formed.

Since the magnetic tape 16 is thus pulled around in a state wherein it is caused by this air film to be in state of slight floatation above the cylindrical surface of the guide drum 81, it does not undergo sliding contact directly on the surface of the guide drum. Accordingly, there is no possibility for the automatic loading operation to damage the magnetic surface of the tape 16.

The magnetic tape 16 is loaded (as indicated by full line in FIG. 2) at the position where the revolving ring 26 has revolved to its final terminal position. The tape height position is regulated at the position (indicated by reference numeral 16*c* in FIG. 3) where the lower edge of the tape contacts the tape guide plate 103.

When the revolving ring 26 has revolved substantially one revolution from the position indicated in FIG. 1 it reaches the position indicated in FIG. 2. The guide post 66 engages and draws tape 16 around the cylindrical surface of the guide drum 81 and past the guide posts 76 and 79. Tape 16 thus brought into contact with this surface over a specific angular region, which in the instant embodiment is somewhat greater than an angle of 180°. At this time, the fact that the required length of the tape 16 has been paid out is detected by the detection means comprising the lamp or luminous device 70 and the photocell or light receiving device 73. From this the completion of loading of the tape 16 is detected. Accordingly, the recording-reproducing apparatus is changed over from the loading mode to the recording or reproducing mode of operation. Consequently, the operating lever 67 shifts to the operation position, and the pinch roller 63 presses the magnetic tape 16 against the capstan 69. Furthermore, the take-up reel disk 95 is actively rotated in the tape take-up direction by the roller 97.

When the revolving ring 26 has revolved to and stopped at the position indicated in FIG. 2, the loading of the magnetic tape 16 into the required tape travel path is completed. The tape travel path formed at this time is as follows. The tape 16 unwound from the tape supply reel 11 is led out of the cassette 10, being guided by the pin 13, and, under the guidance of the tension pole 84 and the guide post 75, comes into contact with the full-width erasing head 74, where the tape is subjected to erasing over its full width in the case of recording (no erasing being carried out for reproducing operation). The tape 16 is next brought into contact diagonally with the cylindrical surface of the guide drum 81 over a certain angular region determined by the guide posts 76 and 79, within which region video signals are recorded or reproduced. Further, the tape 16 contacts the head block 78, where audio signals and control signals are recorded or reproduced. Then, tape 16 reaches the point between the capstan 69 and the pinch roller 63. The tape 16, which is thereby squeezed and driven, is guided by the guide post 66 and caused to undergo a reversal of its travel direction by approximately 180°. The tape 16 then passes by the support post 64 and, guided by the shaft 60 and guide pins 59*a*, 59*b* and 59*c* is further guided by the guide post 50 and the tension pole 92. Thereafter, the tape reenters the cassette 10 at a height which is substantially the same as the height of the tape being paid out from the cassette and, guided by the guide pin 15, is wound on the tape take-up reel 12.

At the time of completion of the above described automatic tape loading, the rotating head of the guide drum 81 is already rotating at a predetermined speed. For this reason, recording on or reproducing from the magnetic tape 16 can be carried out immediately.

At the time of unloading, the motor 17 for loading rotates in the counterclockwise direction, opposite to that described above. All of the members described above operate in a sequence and direction opposite to the sequence and direction of the autoloading mode of operation. Accordingly, the recording-reproducing apparatus changes in state from that of FIG. 2 to that of FIG. 1. The magnetic tape 16 formerly drawn out of the cassette 10 is completely returned again within the cassette 10. In this operation, while the magnetic tape 16 is conformably contacting the guide drum 81, the microswitch 101 is being held closed by the actuating part 100. Therefore the upper guide drum 81*a* is continuing to rotate. For this reason, the magnetic tape 16 does not adhere to the guide drum 81 at the time of unloading. Tape 16 is released from its state of conformable contact with the guide drum when the revolving ring 26 revolves in the counterclockwise direction. At the time when the magnetic tape 16 is substantially completely released from the conformable contact state, the leading end 100*a* of the actuating part 100 separates away from the operating member 101*a* of the microswitch 101, which is thereby opened. The main motor 102 stops.

In the above described embodiment of the apparatus of the invention, only the upper guide drum 81*a* is rotated. However, the upper and lower guide drums 81*a* and 81*b* of the guide drum 81 may be rotated unitarily or separately. Or a separate rotating member may be rotated in addition to the upper and lower guide drums, thereby to form an air film.

Furthermore in the above described embodiment of the invention, the upper guide drum 81*a* rotates for the first time when the magnetic tape 16 has been pulled around to the position when it begins its conformable contact with the cylindrical surface of the guide drum as indicated by single-dot chain line in FIG. 2. However, the guide drum may also be rotated earlier in the operation, for example, together with the start of the automatic loading operation.

Further, this invention is not limited to these embodiments but various variations and modifications may be made without departing from the scope and spirit of the invention. Therefore, the appended claims are to be construed to cover all equivalent structures.

What I claim is:

1. An automatic tape loading recording-reproducing apparatus of the rotation drum type, said apparatus comprising:

a rotatable guide drum means having at least one magnetic head mounted to rotate unitarily with said guide drum;

power driving means for positively driving said guide drum at a predetermined rotational speed;

means for drawing a magnetic tape out of a tape cassette when placed in the apparatus;

means for moving said tape drawing out means to a predetermined position;

tape pulling around means for intercepting the tape thus drawn out and for pulling the tape around the cylindrical surface of said guide drum and thereby load said tape in a conformable contact with the surface of said drum with a wrap around a specific angular extent of said drum;

driving means responsive to the arrival of said tape drawing out means at the predetermined position for stopping said moving means and driving said tape pulling around means; and means for starting the operation of said power driving means at a time between the time when said driving means begins to operate and the time when the tape is brought into conformable contact with one part of said surface over a slight angular extend thereof responsive to said tape pulling around means;

said guide drum being driven in rotation by the driving power means and forming an air film between the drum cylindrical surface and the tape thus pulled around by the tape pulling around means.

2. An automatic tape loading recording-reproducing apparatus as claimed in claim 1 in which said guide drum comprises a rotating upper guide drum having at least one rotary head and drivin in rotation by the power driving means and a stationary lower guide drum separated slightly from the upper guide drum, said upper and lower guide drums forming a cylindrical surface, and said tape pulled around by the tape pulling around means being brought into initial conformable contact with the upper guide drum.

3. The automatic tape loading recording-reproducing apparatus of rotation drum type as claimed in claim 1 in which said tape pulling around means comprises a revolving annular member surrounding the guide drum and mounted to revolve with an inclination relative to the rotational plane of the rotary head of the guide drum, a tape guide member fixed to the revolving annular member and operating to engage the means for drawing the tape out and to pull around the tape in concert with the revolution of the revolving annular member; and said means for starting the operation of the power driving means comprising a switch in a specific position in the vicinity of the revolving annular member, said switch operating to open and close the circuit of the driving power means and an actuating means on the revolving annular member operating interrelatedly with the revolution of the revolving annular member to press against and close the switch.

4. The automatic tape loading recording-reproducing apparatus as claimed in claim 3 in which actuating means is fixed to and extends over a specific extent of the revolving annular member in a manner to operate interrelatedly with the revolution of the revolving annular member to press against and close the switch during the period beginning when said driving means operates and continuing while the tape is being pulled around the tape guide member and is brought into conformable contact with a slight extent of one part of the cylindrical surface of the guide drum, the period ending at the time when the tape thereafter fully contacts the guide drum conformably and is thus loaded.

5. The automatic tape loading recording-reproducing apparatus as claimed in claim 3 in which said actuating means is fixed to a surface of the revolving annular member, said actuating means having an arcuate shape over an extent such as to operate interrelatedly with the revolution of the revolving annular member to close the switch during the time period beginning when said driving means operates and continuing while the tape is being pulled around by the tape guide member and brought into conformable contact with one part of the cylindrical surface of the guide drum, said actuating means continuing to keep the switch closed even after the revolving annular member thereafter revolves to a position corresponding to a completion of a tape loading process and there it stops.

6. An automatic tape loading device for a magnetic recorder having a guide drum with a revolving ring surrounding said drum, an arcuate activating means carried by said ring, said device comprising a source of tape, means for taking up tape drawn from said source, means interposed between said source and take-up means for drawing said tape from said source, means positioned on said ring for pulling said tape drawn from said source around said drum, said arcuate actuating means for starting said guide drum to rotate before said tape touches said drum, said rotated drum forming an air film between said drum and said tape.

7. The tape loading device of claim 6 and a cassette for holding said source and take-up means and said drawing means comprises a lever system for reaching into said cassette and extracting said tape.

8. The tape loading device of claim 7 and annular guide means surrounding said drum and cooperating with said lever system for partially wrapping said tape around said drum.

* * * * *